Figure 1:
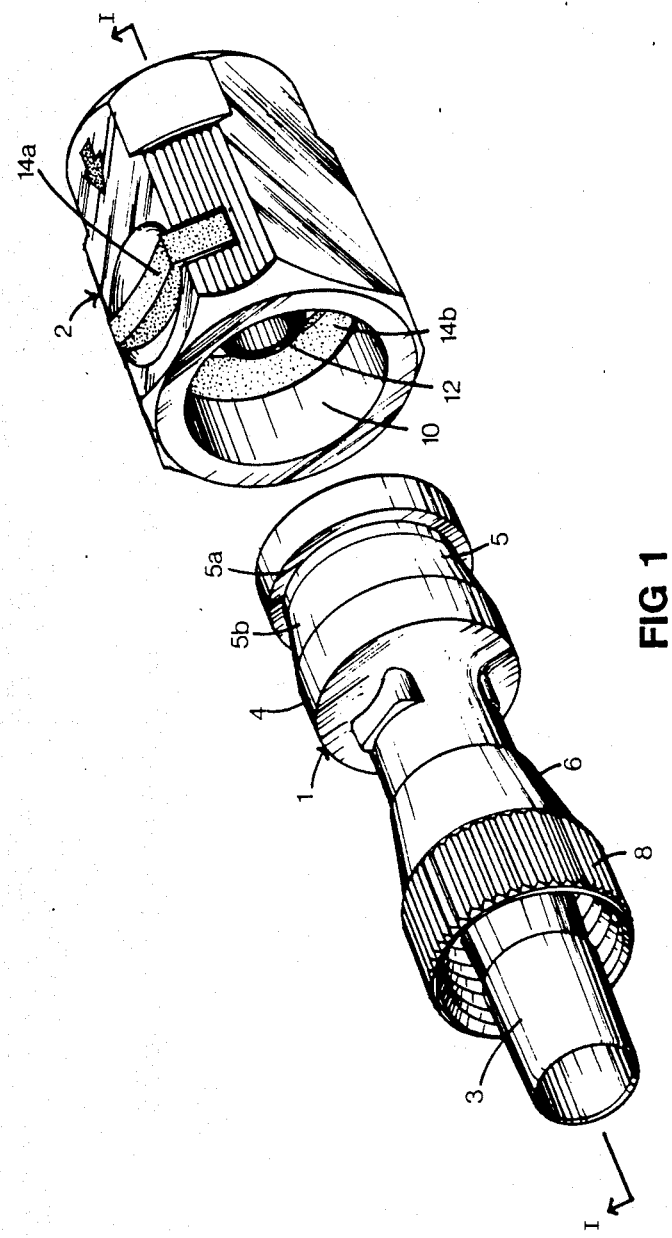

United States Patent [19]

Hansen

[11] Patent Number: 4,700,926
[45] Date of Patent: Oct. 20, 1987

[54] PIPE COUPLING

[76] Inventor: Albert F. Hansen, 8 Punga Grove Road, Whangarei, New Zealand

[21] Appl. No.: 858,460

[22] Filed: Apr. 30, 1986

[30] Foreign Application Priority Data

May 3, 1985 [NZ] New Zealand ......................... 211983
Dec. 23, 1985 [NZ] New Zealand ......................... 214706

[51] Int. Cl.[4] .............................................. F16L 37/28
[52] U.S. Cl. .................. 251/149.8; 285/305; 285/321
[58] Field of Search ............................. 285/305, 321; 251/149.1, 149.8; 137/614.05

[56] References Cited

U.S. PATENT DOCUMENTS

| 3,773,360 | 11/1973 | Timbers | 285/321 |
| 4,039,213 | 8/1977 | Walters | 285/317 |
| 4,114,853 | 9/1978 | Medvick | 251/149.6 |
| 4,244,608 | 1/1981 | Stuemky | 285/305 |
| 4,564,042 | 1/1986 | Ekman | 137/614.05 |
| 4,576,359 | 3/1986 | Oetiker | 251/149.1 |

FOREIGN PATENT DOCUMENTS 2166331 9/1973 Fed. Rep. of Germany ... 251/149.1

Primary Examiner—A. Michael Chambers

[57] ABSTRACT

A pipe coupling having an annular recess in the body portion of a first coupling part, a transverse slot in a second coupling part across the hollow interior thereof, the slot including a slot base wall across one end thereof and being open to the exterior of the second coupling part at the other end thereof, and a release bar in the slot, the release bar including an aperture therethrough of a diameter similar to the diameter of the first coupling part body portion, and including a top portion protruding from the other end of the slot, the release bar being reciprocally movable within the slot across the hollow interior of the second coupling part towards and away from the slot base, between a first position wherein the aperture in the release bar is substantially aligned with the hollow interior such that the body portion of the first coupling part can be entered into or removed from the hollow interior and a second position wherein the aperture is offset from the hollow interior such that an operative portion of the release bar adjacent the periphery of the aperture engages the annular recess of the first coupling part when same is received in the hollow interior, to retain same therein, and the release bar being resiliently urged towards the second position and manually movable therefrom to the first position by pressure application to the protruding top portion of the release bar.

16 Claims, 6 Drawing Figures

PIPE COUPLING

My present invention comprises an improved pipe coupling.

Pipe couplings for coupling two sections of pipe together, or for coupling the end of a pipe to a fitting such as a tap or a machine such as a pump or the like are known in various forms. Typically such couplings comprise two major coupling parts, a first part which comprises a spigot which is in use engaged into the end of a section of pipe to be coupled and a second part which is connectable to a fitting or which comprises a similar spigot so that it can be fitted to a second section of pipe. In use the pipe or pipe and fitting are coupled by connecting the coupling parts together.

My invention provides an improved form of such coupling.

In broad terms my invention may be said to comprise a pipe coupling of the type comprising a first coupling part connectable to a pipe or fitting and including a body portion and a second coupling part connectable to a pipe or fitting and comprising a hollow interior adapted to receive the body portion of the first coupling part in sealing engagement, characterised in that the body portion of the said first coupling part includes an annular recess and in that the said second coupling part includes a transverse slot formed therein across said hollow interior and a release bar slidably mounted in the said transverse slot and comprising an aperture therethrough of a diameter similar to the diameter of the said first coupling part body portion, said release bar being movable between a first position wherein said aperture is substantially aligned with said hollow interior such that said body portion can be entered into or removed from the said hollow interior and a second position wherein the said aperture is offset from the said hollow interior such that an operative portion of the periphery of said aperture engages said annular recess of the body portion of the said first coupling part when same is received in said hollow interior to retain same therein, and said release bar being resiliently urged towards said second position and manually movable therefrom to said first position.

In one preferred form the coupling of the invention includes in one of the coupling parts multi-stage flow valving arranged to control the flow of fluid through the coupling part and to be caused to open by connection of the coupling parts together, the flow valving otherwise being closed when the coupling parts are separated to prevent the escape of fluid.

Figure 2:
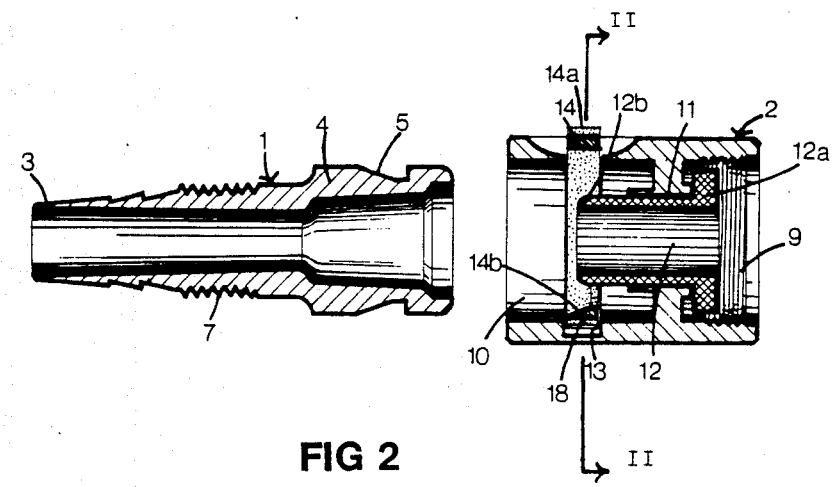
Figure 3:
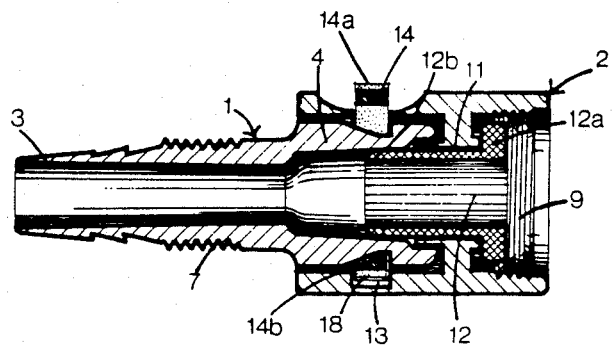
Figure 4:
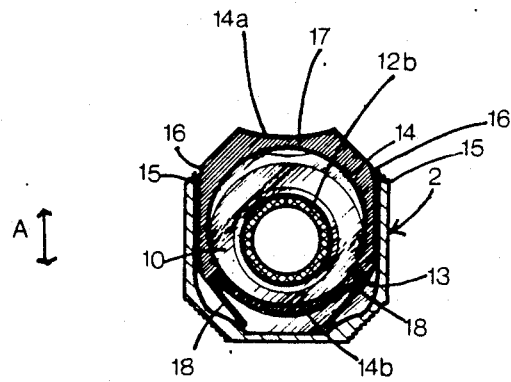
Figure 5:
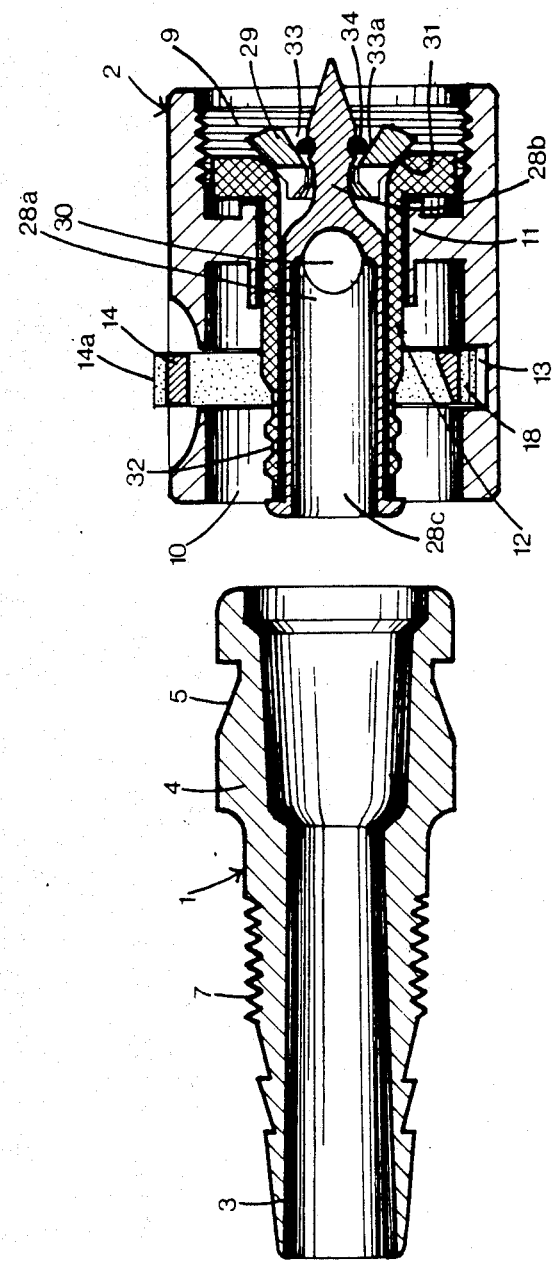
Figure 6:
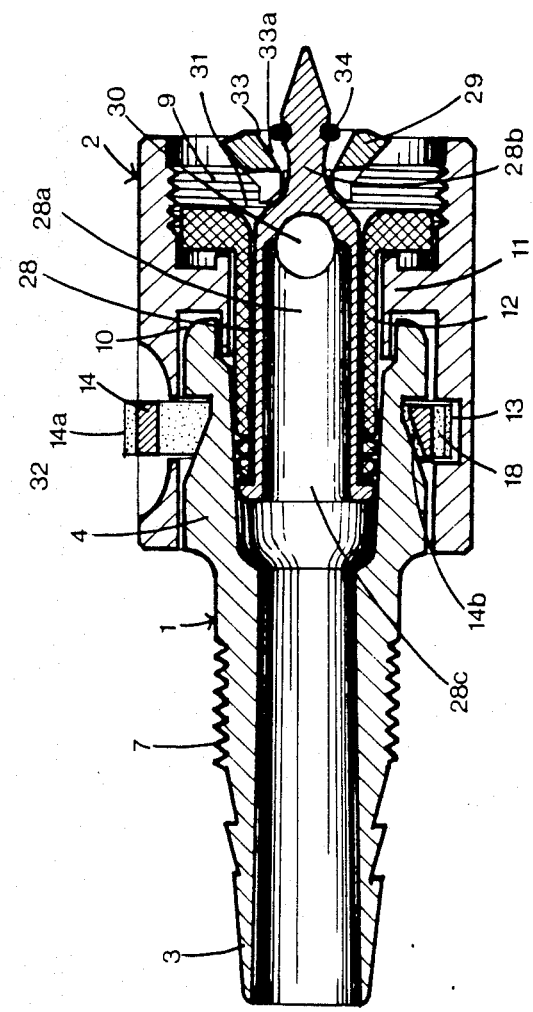

Two preferred forms of the coupling of the invention are illustrated in the accompanying drawings, wherein:

FIG. 1 is a perspective view of the two parts of the first preferred form coupling, which does not include flow valving, when separated, FIG. 2 is a longitudinal cross-sectional view of the first preferred form couping parts when separated, along line I—I of FIG. 1, FIG. 3 is a longitudinal cross-sectional view of the first preferred form coupling parts when connected together, FIG. 4 is a transverse cross-sectional view of the second coupling part of the first preferred form coupling, along lines II—II of FIG. 2, FIG. 5 is a longitudinal cross-sectional view of the two parts of the second preferred form coupling, which includes flow valving, when separated, and FIG. 6 is a longitudinal cross-sectional view of the two parts of the second preferred form coupling when coupled together.

Reference numerals 1 and 2 in all figures of the drawings indicate the first and second coupling parts of both of the preferred forms of the coupling, which are suitably formed from a plastics material such as polythene, alkathene or nylon, or brass or the like.

The first coupling part 1 generally comprises a spigot 3 and a body portion 4, which is preferably generally cylindrical in shape as shown. The body portion 4 comprises an annular recess 5, which is preferably shaped as shown having a first substantially vertical wall 5a adjacent the nose of the body portion 4 and a sloping rear wall 5b extending towards the rear of the body portion. The coupling part 1 may be secured to the end of a pipe by a conventional hose clip or alternatively by way of the arrangement shown, wherein a nut 6 (shown in FIG. 1) carried on a threaded boss portion 7 is arranged to be screwed to engage with its forward threads the exterior of the end of a pipe engaged on to the spigot 3. The nut 6 has a tapered interior and the spigot 3 can have a generally tapered exterior as shown. The exterior of the nut can be suitably ribbed as indicated at 8, to enable it to be readily gripped in use. Such an arrangement is described in my New Zealand patent specification No. 195771/200149.

The second coupling part 2, is in the forms of coupling shown, at one end adapted to be connected to a fitting such as a tap, and includes a screw threaded portion 9 as shown. It could alternatively comprise a suitable spigot, for example, enabling the second coupling part to be connected to the end of another section of piping. The coupling could comprise as an accessory, a joiner tail adapted to be screwed into the threaded portion 9 and having a spigot in this regard. At its other end the second coupling part comprises a hollow interior 10 adapted to receive the body portion 4 of the first coupling part when the coupling parts are connected together. In the preferred forms the coupling part 2 is shaped at 11 as shown so as to mount a longitudinally extending sealing member 12 formed of rubber or a like sealing material. The sealing member 12 has a circular sealing ring portion 12a adapted to seal against the end of a tap fitting onto which the second coupling part is fitted, and a portion 12b arranged to extend into and engage with the first coupling part in use (see FIG. 3).

A transverse slot 13 is formed in the second coupling part across the hollow interior thereof as shown. A release bar 14 which in the preferred form shown is generally square in peripheral shape, is slidably mounted in the transverse slot 13 such that it can slide therein in the direction of arrows A. The sliding movement of the release bar 14 is limited and the release bar is retained in the transverse slot by nibs 15 (see FIG. 4) formed on either upper edge of the transverse slot, which engage into slight recesses 16 formed at either upper corner of the release bar 14 such that at the full extent of the outward movement of the release bar the nibs 15 will abut the bottom of the recesses 16.

The release bar 14 has an aperture 17 therethrough as shown, which is of a diameter similar to the diameter of the body portion 4 of the coupling part 1. The release bar is movable between a first position wherein its aperture 17 is aligned with the hollow interior of the coupling part 2 (not shown in the drawings) and a second position (shown in the drawings and particularly in FIG. 4) wherein the aperture 17 is offset from the hollow interior. The release bar is resiliently urged towards the second position, in the preferred forms shown by spring legs 18 formed on the bottom of the release bar as shown. When the release bar is moved from its second position to its first position, by manual pressure applied to its top 14a, the spring legs 18 will flex inwardly towards each other and be collapsed. When manual pressure is removed they will resiliently flex outwardly to urge the release bar back to its second position. In other forms of the invention other arrangements of urging means for the release bar may be provided.

In use of both preferred forms of coupling the coupling parts are connected by engaging the coupling part 1 and, specifically, by entering the body portion 4 into the hollow interior 10. When the body portion 4 is fully home within the hollow interior 10 the release bar 14 will be urged towards its normal second position and the arrangement is such that the release bar operative portion 14b engages into the annular recess 5 to retain the coupling part 1 in position and to secure the coupling. The coupling parts can be disconnected and the coupling part 1 removed from the coupling part 2 by pressing the top of the release bar 14a to move the release bar 14 to its first position, and withdrawing the coupling part 1. While the arrangement could be such that such manual movement of the release bar is also required to enable the coupling parts to be connected, it is preferred that the release bar is able to be moved from its normal second position to its first position against the urging of the spring legs 18 by the engagement of the nose of the body portion 4 against the operative position 14b of the release bar as the coupling parts are brought together, so that the first coupling part 1 may be 'snapped into' the second coupling part 2. To facilitate this the operative portion 14b of the release bar is preferably sloped towards the entry to the hollow interior 10 as shown.

Couplings in accordance with the invention may incorporate a self-sealing flow valve arranged to prevent the flow of liquid from one coupling part when the coupling parts are disconnected.

The second preferred form coupling of the invention shown in FIGS. 5 and 6 includes a particularly preferred form of two stage flow valving. The valving is incorporated in the second coupling part 2 which would normally be on the 'upstream' side of the coupling so that when the coupling parts are disconnected the flow of fluid from the upstream pipe or fitting is prevented. When the coupling parts are connected together the valving is operated to enable the flow of fluid through the coupling. In the second preferred form coupling shown the valving comprises a valve member 28 and a valve head 29. The valve member 28 is longitudinally slidably movable within the coupling part 2 between the closed position shown in FIG. 5 and the open position shown in FIG. 6. The valve member 28 has a valve body portion 28a having a hollow valve interior which is open at one end 28c. The valve member 28 terminates at its other end in an extending valve stem 28b as shown. Ports 30 are provided in the valve member 28 to communicate the hollow interior of the body portion 28a with the exterior, adjacent the base of the stem 28b.

The valve member 28 is slidably mounted in the second coupling part 2 between an open and a closed position, through an aperture the upper peripheral edge of which forms a major valve seat. In the arrangement shown the valve member is mounted by way of the rubber sealing member 12. The upper peripheral edge 31 of this aperture forms the major valve seat against which the valve head 29 is adapted to engage when the valving is closed. The sealing member 12 is a friction fit within the coupling part 2 and has a thin walled collapsible end portion 32 which in turn is a friction fit about the body portion of the valve 28 adjacent its end 28c as shown.

The valve head 29 is loosely mounted about the valve stem 28b as shown. The valve head 29 is circular in plan view (not shown) and the stem 28b of the valve member 28 extends axially through an aperture 33 in the valve head 29. The upper edge 33a of this aperture 32 forms a minor valve seat. The valve head is retained on the valve stem 28b by an O-ring 34 which forms an enlarged end portion of the same and which is adapted to engage the minor valve seat 33a when the valving is closed.

In use when the coupling parts are disconneted as shown in FIG. 5 the valve head 29 engages the major valve seat 31 and the O-ring 34 in turn engages the minor valve seat 33a in the valve head, so that fluid flow past the valve is prevented. In use the valving will be maintained in this closed position by fluid pressure on the upstream side of the valve.

When the coupling is connected, as the coupling parts 1 and 2 are brought together, the coupling part 1 contacts the end 28c of the valve member 28 and moves same such that the valve stem 28b moves through the valve head 29. The O-ring 34 unseats from the minor seat 33a allowing a small initial flow of fluid through the valve head aperture 33 around the stem 28b. This flow of water contacts the major valve seat 31a assisting in lifting the valve head 29 therefrom so that as the coupling part 1 and valve member 28 moves further and physically lifts the valve head 29 from the seat 31a this initial water flow will tend to release pressure on the upstream side of the coupling to assist in enabling same.

The valve head 29 may be shaped so as to assist this initial water flow lifting action. It is preferred, for example, for the bottom of the valve head to include radially extending slots, so that it has a generally inverted castellated shape (which is shown in FIGS. 5 and 6).

The foregoing describes my invention including preferred forms thereof. Alterations and modifications as will be obvious to those skilled in the art are intended to be incorporated within the scope hereof, which is defined in the following claims.

I claim:

1. A pipe coupling comprising:
   a first coupling part connectable to a pipe or fitting and including a body portion,
   a second coupling part connectable to a pipe or fitting and comprising a hollow interior adapted to receive the body portion of the first coupling part in sealing engagement,
   an annular recess in said body portion of said first coupling part,
   a transverse slot in said second coupling part across said hollow interior, said slot comprising a slot base wall across one end thereof and being open to the exterior of said second coupling part at the other end thereof, and
   a release bar in said slot, said release bar comprising an aperture therethrough of a diameter similar to the diameter of the said first coupling part body portion, and comprising a portion protruding from said other end of said slot, said release bar being reciprocally movable within said slot across said hollow interior of said second coupling part towards and away from said slot base, between a first position wherein said aperture in said release bar is substantially aligned with said hollow interior such that said body portion of said first coupling apart can be entered into or removed from the said hollow interior and a second position wherein said aperture is offset from the said hollow interior such that an operative portion of said release bar adjacent the periphery of said aperture engages said annular recess of the said first coupling part when same is received in said hollow interior, to retain same therein, and said release bar being resiliently urged towards said second position and manually movable therefrom to said first position by pressure application to said protruding top portion of said release bar.

2. A pipe coupling as claimed in claim 1, wherein the said release bar is additionally movable from said second position to said first position against said resilient urging by engagement of the nose of the first coupling part body portion against the operative portion of the release bar as same is entered into said hollow interior.

3. A pipe coupling as claimed in claim 2, wherein the said operative portion of the said release bar is sloped towards the entry to the said hollow interior.

4. A pipe coupling as claimed in claim 3, wherein the said annular recess in the said first coupling part body portion comprises a first substantially vertical wall adjacent said nose portion and a second sloping wall extending towards the rear of the body portion.

5. A pipe coupling as claimed in claim 4, wherein said first coupling part body portion and said second coupling part hollow interior are substantially cylindrical in shape.

6. A pipe coupling as claimed in claim 5, wherein the said second coupling part includes a longitudinally extending hollow sealing member arranged to extend into and engage with the first coupling part when the coupling parts are connected.

7. A pipe coupling of the type comprising a first coupling part connectable to a pipe or fitting and including a body portion and a second coupling part connectable to a pipe or fitting and comprising a hollow interior adapted to receive the body portion of the first coupling part in sealing engagement, characterised in that the body portion of the said first coupling part includes an annular recess and in that the said second coupling part includes a transverse slot formed therein across said hollow interior and a release bar slidably mounted in the said transverse slot and comprising an aperture therethrough of a diameter similar to the diameter of the said first coupling part body portion, said release bar being movable between a first position wherein said aperture is substantially aligned with said hollow interior such that said body portion can be entered into or removed from the said hollow interior and a second position wherein the said aperture of the release bar is offset from the said hollow interior such that an operative portion of the periphery of said aperture engages the said annular recess of the said first coupling part when same is received in said hollow interior to retain same therein, and said release bar being resiliently urged towards said second position and manually movable therefrom to said first position, said coupling further including multi-stage valving in the first coupling part arranged to control the flow of fluid through the coupling and to be caused to open by connection of the second coupling part to the first coupling part, said valving comprising a valve member longitudinally slidably movable in the second coupling part between an open position and a closed position, through an aperture the upper peripheral edge of which forms a major valve seat, said valve member comprising a body portion which is internally hollow and open at one end and which terminates at its other end in an extending stem and said valve member including at least one port communicating the hollow valve interior to the exterior adjacent the base of the said stem, a valve head mounted about the said valve stem such that the valve stem extends through an aperture in said valve head the upper peripheral edge of said aperture forming a minor valve seat and the distal end of the said valve stem being enlarged and adapted to seal against the said minor valve seat when the valve is closed, to prevent the flow of fluid through the said valve head, the said valve head being adapted to engage the said major valve seat and the said enlarged distal valve stem and the said minor valve seal when the valve is closed and the said valve head being shaped and or arranged to direct fluid under pressure when said enlarged stem end is unseated from said minor valve seat during connection of the coupling parts so as to assist in lifting said valve head from said major valve seat.

8. A coupling as claimed in claim 7, wherein said valve head is of an inverted castellated configuration.

9. A pipe coupling of the type comprising a first coupling part connectable to a pipe or fitting and including a body portion and a second coupling part connectable to a pipe or fitting and comprising a hollow interior adapted to receive the body portion of the first coupling part in sealing engagement, characterised in that the body portion of the said first coupling part includes an annular recess and in that the said second coupling part includes a transverse slot formed therein across said hollow interior and a release bar slidably mounted in the said transverse slot and comprising an aperture therethrough of a diameter similar to the diameter of the said first coupling part body portion, said release bar being movable between a first position wherein said aperture is substantially aligned with said hollow interior such that said body portion can be entered into or removed from the said hollow interior and a second position wherein the said aperture of the release bar is offset from the said hollow interior such that an operative portion of the periphery of said aperture engages the said annular recess of the said first coupling part when same is received in said hollow interior to retain same therein, and said release bar being resiliently urged towards said second position and manually movable therefrom to said first position, wherein the said release bar is movable from said second position to said first position against said resilient urging by engagement of the nose of the first coupling part body portion against the operative portion of the release bar as same is entered into said hollow interior, and said coupling including multi-stage valving in the first coupling part arranged to control the flow of fluid through the coupling and to be caused to open by connection of the second coupling part to the first coupling part, said valving comprising a valve member longitudinally slidably movable in the second coupling part between an open position and a closed position, through an aperture the upper peripheral edge of which forms a major valve seat, said valve member comprising a body portion which is internally hollow and open at one end and which terminates at its other end in an extending stem and said valve member including at least one port communicating the hollow valve interior to the exterior adjacent the base of the said stem, a valve head mounted about the said valve stem such that the valve stem extends through an aperture in said valve head the upper peripheral edge of said aperture forming a minor valve seat and the distal end of the said valve stem being enlarged and adapted to seal against the said minor valve seat when the valve is closed, to prevent the flow of fluid through the said valve head, the said valve head being adapted to engage the said major valve seat and the said enlarged distal valve stem and the said minor valve seal when the valve is closed and the said valve head being shaped and or arranged to direct fluid under pressure when said enlarged stem end is unseated from said minor valve seat during connection of the coupling parts so as to assist in lifting said valve head from said major valve seat.

10. A coupling as claimed in claim 9, wherein said valve head is of an inverted castellated configuration.

11. A pipe coupling of the type comprising a first coupling part connectable to a pipe or fitting and including a body portion and a second coupling part connectable to a pipe or fitting and comprising a hollow interior adapted to receive the body portion of the first coupling part in sealing engagement, characterised in that the body portion of the said first coupling part includes an annular recess and in that the said second coupling part includes a transverse slot formed therein across said hollow interior and a release bar slidably mounted in the said transverse slot and comprising an aperture therethrough of a diameter similar to the diameter of the said first coupling part body portion, said release bar being movable between a first position wherein said aperture is substantially aligned with said hollow interior such that said body portion can be entered into or removed from the said hollow interior and a second position wherein the said aperture of the release bar is offset from the said hollow interior such that an operative portion of the periphery of said aperture engages the said annular recess of the said first coupling part when same is received in said hollow interior to retain same therein, and said release bar being resiliently urged towards said second position and manually movable therefrom to said first position, wherein the said release bar is movable from said second position to said first position against said resilient urging by engagement of the nose of the first coupling part body portion against the operative portion of the release bar as same is entered into said hollow interior, and wherein the said operative portion of the said release bar is sloped towards the entry to the said hollow interior, and said coupling including multi-stage valving in the first coupling part arranged to control the flow of fluid through the coupling and to be caused to open by connection of the second coupling part to the first coupling part, said valving comprising a valve member longitudinally slidably movable in the second coupling part between an open position and a closed position, through an aperture the upper peripheral edge of which forms a major valve seat, said valve member comprising a body portion which is internally hollow and open at one end and which terminates at its other end in an extending stem and said valve member including at least one port communicating the hollow valve interior to the exterior adjacent the base of the said stem, a valve head mounted about the said valve stem such that the valve stem extends through an aperture in said valve head the upper peripheral edge of said aperture forming a minor valve seat and the distal end of the said valve stem being enlarged and adapted to seal against the said minor valve seat when the valve is closed, to prevent the flow of fluid through the said valve head, the said valve head being adapted to engage the said major valve seat and the said enlarged distal valve stem and the said minor valve seal when the valve is closed and the said valve head being shaped and or arranged to direct fluid under pressure when said enlarged stem end is unseated from said minor valve seat during connection of the coupling parts so as to assist in lifting said valve head from said major valve seat.

12. A coupling as claimed in claim 11, wherein said valve head is of an inverted castellated configuration.

13. A pipe coupling of the type comprising a first coupling part connectable to a pipe or fitting and including a body portion and a second coupling part connectable to a pipe or fitting and comprising a hollow interior adapted to receive the body portion of the first coupling part in sealing engagement, characterised in that the body portion of the said first coupling part includes an annular recess and in that the said second coupling part includes a transverse slot formed therein across said hollow interior and a release bar slidably mounted in the said transverse slot and comprising an aperture therethrough of a diameter similar to the diameter of the said first coupling part body portion, said release bar being movable between a first position wherein said aperture is substantially aligned with said hollow interior such that said body portion can be entered into or removed from the said hollow interior and a second position wherein the said aperture of the release bar is offset from the said hollow interior such that an operative portion of the periphery of said aperture engages the said annular recess of the said first coupling part when same is received in said hollow interior to retain same therein, and said release bar being resiliently urged towards said second position and manually movable therefrom to said first position, wherein the said release bar is movable from said second position to said first position against said resilient urging by engagement of the nose of the first coupling part body portion against the operative portion of the release bar as same is entered into said hollow interior, wherein the said operative portion of the said release bar is sloped towards the entry to the said hollow interior, and wherein the said annular recess in the said first coupling part body portion comprises a first substantially vertical wall adjacent said nose portion and a second sloping wall extending towards the rear of the body portion, and said coupling including multi-stage valving in the first coupling part arranged to control the flow of fluid through the coupling and to be caused to open by connection of the second coupling part to the first coupling part, said valving comprising a valve member longitudinally slidably movable in the second coupling part between an open position and a closed position, through an aperture the upper peripheral edge of which forms a major valve seat, said valve member comprising a body portion which is internally hollow and open at one end and which terminates at its other end in an extending stem and said valve member including at least one port communicating the hollow valve interior to the exterior adjacent the base of the said stem, a valve head mounted about the said valve stem such that the valve stem extends through an aperture in said valve head the upper peripheral edge of said aperture forming a minor valve seat and the distal end of the said valve stem being enlarged and adapted to seal against the said minor valve seat when the valve is closed, to prevent the flow of fluid through the said valve head, the said valve head being adapted to engage the said major valve seat and the said enlarged distal valve stem and the said minor valve seal when the valve is closed and the said valve head being shaped and or arranged to direct fluid under pressure when said enlarged stem end is unseated from said minor valve seat during connection of the coupling parts so as to assist in lifting said valve head from said major valve seat.

14. A coupling as claimed in claim 13, wherein said valve head is of an inverted castellated configuration.

15. A pipe coupling of the type comprising a first coupling part connectable to a pipe or fitting and including a body portion and a second coupling part connectable to a pipe or fitting and comprising a hollow interior adapted to receive the body portion of the first coupling part in sealing engagement, characterised in that the body portion of the said first coupling part includes an annular recess and in that the said second coupling part includes a transverse slot formed therein across said hollow interior and a release bar slidably mounted in the said transverse slot and comprising an aperture therethrough of a diameter similar to the diameter of the said first coupling part body portion, said release bar being movable between a first position wherein said aperture is substantially aligned with said hollow interior such that said body portion can be entered into or removed from the said hollow interior and a second position wherein the said aperture of the release bar is offset from the said hollow interior such that an operative portion of the periphery of said aperture engages the said annular recess of the said first coupling part when same is received in said hollow interior to retain same therein, and said release bar being resiliently urged towards said second position and manually movable therefrom to said first position, wherein the said release bar is movable from said second position to said first position against said resilient urging by engagement of the nose of the first coupling part body portion against the operative portion of the release bar as same is entered into said hollow interior, wherein the said operative portion of the said release bar is sloped towards the entry to the said hollow interior, wherein the said annular recess in the said first coupling part body portion comprises a first substantially vertical wall adjacent said nose portion and a second sloping wall extending towards the rear of the body portion, and wherein said first coupling part body portion and said second coupling part hollow interior are substantially cylindrical in shape, and said coupling including multi-stage valving in the first coupling part arranged to control the flow of fluid through the coupling and to be caused to open by connection of the second coupling part to the first coupling part, said valving comprising a valve member longitudinally slidably movable in the second coupling part between an open position and a closed position, through an aperture the upper peripheral edge of which forms a major valve seat, said valve member comprising a body portion which is internally hollow and open at one end and which terminates at its other end in an extending stem and said valve member including at least one port communicating the hollow valve interior to the exterior adjacent the base of the said stem, a valve head mounted about the said valve stem such that the valve stem extends through an aperture in said valve head the upper peripheral edge of said aperture forming a minor valve seat and the distal end of the said valve stem being enlarged and adapted to seal against the said minor valve seat when the valve is closed, to prevent the flow of fluid through the said valve head, the said valve head being adapted to engage the said major valve seat and the said enlarged distal valve stem and the said minor valve seal when the valve is closed and the said valve head being shaped and or arranged to direct fluid under pressure when said enlarged stem end is unseated from said minor valve seat during connection of the coupling parts so as to assist in lifting said valve head from said major valve seat.

16. A coupling as claimed in claim 15, wherein said valve head is of an inverted castellated configuration.

* * * * *